(12) United States Patent
Qiu

(10) Patent No.: US 10,490,858 B2
(45) Date of Patent: Nov. 26, 2019

(54) LITHIATION OF ELECTRODES FOR CYLINDRICAL ENERGY STORAGE DEVICES AND METHOD OF MAKING SAME

(71) Applicant: Kathleen Qiu, Hayward, CA (US)

(72) Inventor: Kathleen Qiu, Hayward, CA (US)

( * ) Notice: Subject to any disclaimer, the term of this patent is extended or adjusted under 35 U.S.C. 154(b) by 0 days.

(21) Appl. No.: 16/355,133

(22) Filed: Mar. 15, 2019

(65) Prior Publication Data

US 2019/0237813 A1    Aug. 1, 2019

Related U.S. Application Data

(63) Continuation-in-part of application No. 16/252,149, filed on Jan. 18, 2019.

(60) Provisional application No. 62/624,991, filed on Feb. 1, 2018.

(51) Int. Cl.

| | | |
|---|---|---|
| H01M 10/0587 | (2010.01) | |
| H01M 4/139 | (2010.01) | |
| H01M 2/36 | (2006.01) | |
| H01M 10/0525 | (2010.01) | |
| H01G 11/86 | (2013.01) | |
| H01G 11/62 | (2013.01) | |
| H01G 11/22 | (2013.01) | |
| H01G 11/66 | (2013.01) | |

(52) U.S. Cl.
CPC ........ *H01M 10/0587* (2013.01); *H01G 11/86* (2013.01); *H01M 2/361* (2013.01); *H01M 4/139* (2013.01); *H01M 10/0525* (2013.01); *H01G 11/22* (2013.01); *H01G 11/62* (2013.01); *H01G 11/66* (2013.01)

(58) Field of Classification Search
CPC ........ H01G 11/66; H01G 11/86; H01G 11/22; H01M 2/361; H01M 4/139; H01M 10/0525

See application file for complete search history.

(56) References Cited

U.S. PATENT DOCUMENTS

| | | |
|---|---|---|
| 2015/0017543 A1 | 1/2015 | Lee et al. |
| 2015/0263379 A1 | 9/2015 | Xiao et al. |

OTHER PUBLICATIONS

Florian Holtstiege et al: "Pre-Lithiation Strategies for Rechargeable Energy Storage Technologies: Concepts, Promises and Challenges," Batteries, vol. 4, No. 1 Jan. 23, 2018, p. 4.

*Primary Examiner* — Seahvosh Nikmanesh
(74) *Attorney, Agent, or Firm* — Stetina Brunda Garred and Brucker; Mark B. Garred

(57) ABSTRACT

A method for lithiation of an electrode includes providing a roll including an electrode to be lithiated, attaching a current collector to the roll, placing a piece of lithium metal with predetermined weight in contact with the current collector, enclosing the roll, the current collector, and the piece of lithium metal in a can with a lid, and filling the can with an electrolyte containing a lithium salt.

20 Claims, 7 Drawing Sheets

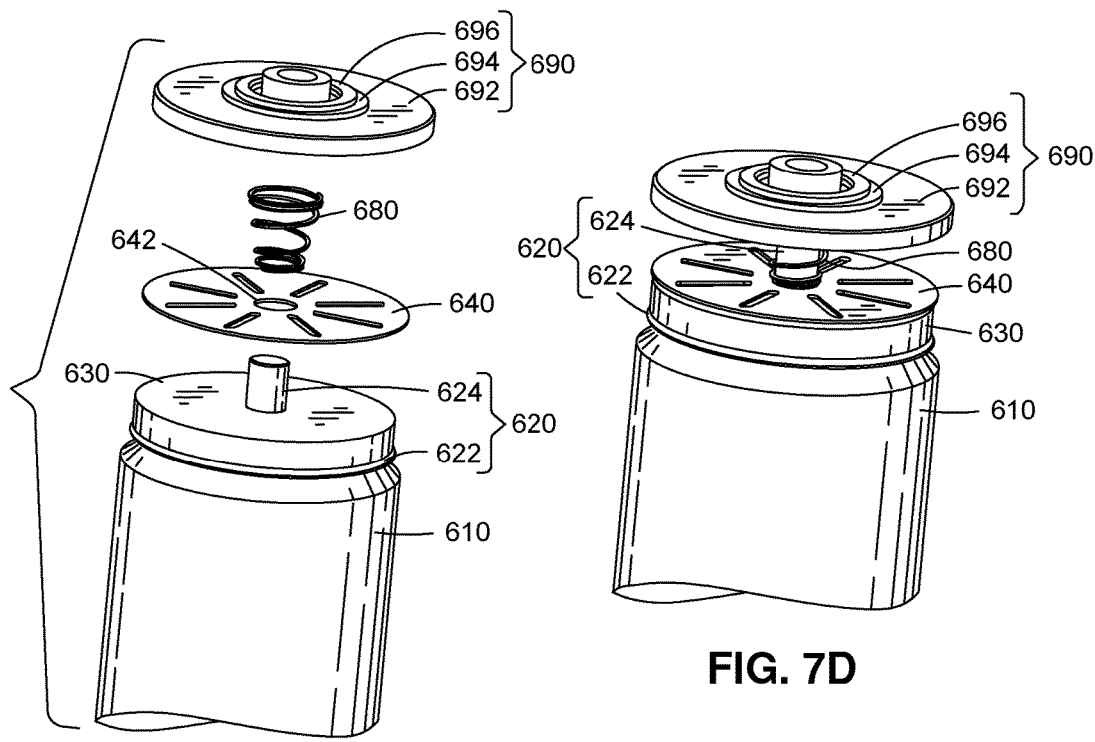
FIG. 7C
FIG. 7D
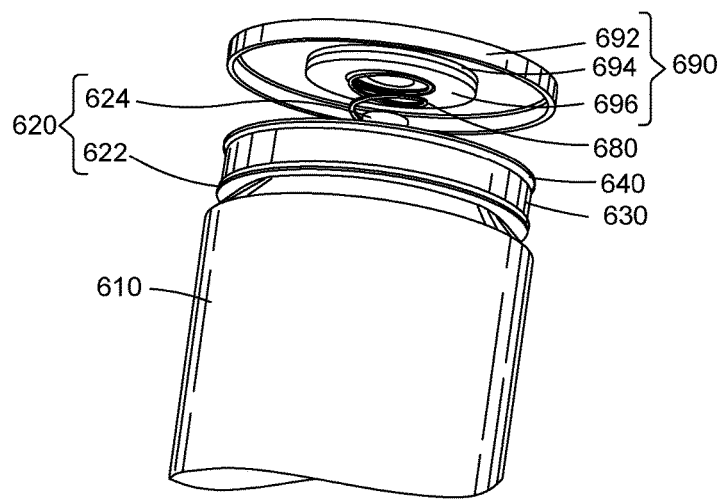
FIG. 8

LITHIATION OF ELECTRODES FOR CYLINDRICAL ENERGY STORAGE DEVICES AND METHOD OF MAKING SAME

CROSS-REFERENCE TO RELATED APPLICATIONS

This application is a continuation-in-part of U.S. patent application Ser. No. 16/252,149, filed Jan. 18, 2019 and entitled "LITHIATION OF ELECTRODES FOR CYLINDRICAL ENERGY STORAGE DEVICES AND METHOD OF MAKING SAME," which relates to and claims the benefit of U.S. Provisional Application No. 62/624,991, filed Feb. 1, 2018 and entitled "LITHIATION OF ELECTRODES FOR CYLINDRICAL ENERGY STORAGE DEVICES AND METHOD OF MAKING SAME," the entire disclosures of both of which are hereby incorporated by reference.

STATEMENT RE: FEDERALLY SPONSORED RESEARCH/DEVELOPMENT

Not Applicable

BACKGROUND

1. Technical Field

Apparatuses and methods consistent with the present inventive concept relate to energy storage devices, and more particularly to electrodes for energy storage devices.

2. Related Art

Lithium (Li) pre-doped electrodes, or lithiated electrodes, are widely used in energy storage devices, for example, lithium-ion (Li-ion) batteries and Li-ion capacitors.

In the external Li attachment and pre-dope method, an electrode pack is constructed with at least one positive electrode, at least one separator, at least one Li film laminated on a current collector, and at least one negative electrode. The negative electrode is connected to the Li film through welding of the current collector tabs. The electrode pack is immersed in electrolyte that contains Li ions. Through the pre-dope process, the Li film is converted into Li ions and the Li ions migrate and are doped into the negative electrode.

In the external Li attachment and pre-dope method, thin Li metal films are normally provided on the uppermost and lowermost layers of an electrode package. During the Li pre-dope process, the Li ions have to travel through the electrode and separator layers. One of the requirements is that the current collectors inside the electrodes needs to be in a mesh or perforation format, which is costly, and the Li may be non-uniformly doped into the stacked negative electrode layers even though the current collectors in the center of the electrodes are made porous. Long manufacture time is reported to uniformly dope lithium to the negative electrode inside the electrode laminates. Further, as Li metal is very sensitive to moisture, the entire operation of the manufacture of the electrodes attached to Li metal, the electrode packs, and the energy storage devices must be carried out in a full scale dry room, which requires high capital investment and high energy consumption. Therefore, the long manufacture cycle time plus the dry room operation requirements, makes this high cost method less competitive in the energy storage device industry.

In order to improve the long manufacture time and high cost necessary for the external Li attachment and pre-dope method, direct contact methods were proposed by different inventors as described, for example, in U.S. Patent Application Pub. No. 2017/0062815, the entire contents of which is incorporated by reference herein. In the direct contact methods, Li powder or Li film with patterns were pressed directly onto the electrode surface layer. The direct contact methods largely shortened the Li pre-dope time. However, Li metal powder or foils may remain on the electrode surface after completion of the pre-doping process, which again presents a high safety issue for the energy storage devices. More detrimentally, instantaneous electrical shorting between the Li metal and the negative electrode active layer materials (i.e., the surface of the electrode) induced by immersing the electrode pack into electrolyte caused severe reactions. These severe reactions resulted in damage to the electrode and separator, resulting in sub-par batteries and capacitors. Further, the direct contact method still requires the whole manufacture process being carried out in a full scale dry room environment, which again, requires high capital investment and high energy consumption in operations.

In order to reduce the energy storage device manufacture time and cost, to eliminate the need for expensive full scale dry room operations, and to prevent the damage caused to the electrode by direct contact, new lithiation methods to produce Li pre-doped electrodes for energy storage devices have been newly developed as set forth herein.

SUMMARY

Various embodiments provide lithiated or pre-doped electrodes and methods for fabricating lithiated or pre-doped electrodes. Lithiation can be introduced to the electrode at the different assembly stages of a cylindrical energy storage device.

Steps and corresponding stages of a typical large scale energy storage device assembly process are listed below:
 1. Prepare an electrode in a roll to roll format (Stage 1)
 2. Prepare an electrode pack: wind the jellyroll (Stage 2)
 3. Connect the jellyroll to a lid
 4. Insert the jellyroll into a can, the cell assembly (Stage 3)
 5. Vacuum dry the cell assembly
 6. Impregnation of the electrolyte
 7. Seal the lid to the can According to various embodiments there is provided a method for lithiation, or Li pre-doping, of an electrode. In some embodiments, the method may include a Step 1 of preparing a roll with an electrode to be lithiated. The roll may consist of a single electrode (i.e. a Stage 1 roll also referred to as an electrode roll). Alternatively, the roll may consist of an electrode pack, e.g. a jellyroll, consisting of at least one negative electrode, at least one separator, and at least one positive electrode (i.e. a Stage 2 roll also referred to as an electrode pack). Alternatively, the roll may consist of an unfinished battery or ultracapacitor with an electrode pack, e.g. a jellyroll, inside a case and with or without an unsealed lid (i.e. a Stage 3 roll also referred to as a cell assembly). Step 1 may include preparing the roll in a normal air environment, drying the roll in a vacuum oven, and moving the roll into a dry box or a small dry room. The method may further include a Step 2 of preparing a piece of Li metal with predetermined weight separately in the dry box or the small dry room and, optionally, attaching the piece of Li metal to a conductive material with high conductivity, such as copper or nickel foil. The method may further include a Step 3 of attaching the piece of Li metal or the conductive material to a current collector of the electrode to be lithiated or to a metal tab connected to or from a current collector of the electrode to be lithiated, a Step 4 of placing at least one roll into a container, and a Step 5 of filling the container with electrolyte containing Li salts. The order of the steps can be changed. For example, Step 4 and Step 5 can be reversed. The Li metal may be located anywhere in relation to the roll. In some embodiments, the container inner wall may be made conductive and the lithium metal can be attached on or be a part of the inner wall. In that case, Steps 3 and 4 can be reversed.

In the case of lithiation of the Stage 3 roll, i.e. the cell assembly, one of the options is that the cell packaging case containing the jellyroll or other electrode pack, also referred to as the "can" of the cell assembly, may itself serve as the container of Steps 4 and 5. The most significant advantage of this approach is that the large dry room for the electrode preparation and the cell manufacture is not needed. Lithium is not introduced during the processes of preparing the electrode or electrode pack, e.g. jellyroll. It is introduced only during the later steps of the cell assembly.

BRIEF DESCRIPTION OF THE DRAWINGS

FIGS. 7A-7D show an example sequence of steps of the lithiation method of FIG. 6, with FIG. 7A showing placement of a piece of Li metal on a current collector, FIG. 7B showing the Li metal on the current collector, FIG. 7C showing placement of a cover plate on the piece of Li metal, and FIG. 7D showing compression of a spring by the lid assembly.

FIG. 8 shows a bottom perspective view of the step shown in FIG. 7D.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Various embodiments provide a lithiation method for producing Li pre-doped electrodes. The lithiation method may reduce the manufacture time and cost compared to the conventional Li attachment and pre-dope methods, and may further prevent electrode and separator damage caused during the pre-dope process in the direct contact methods. In some cases, it may reduce, minimize or eliminate the usage of a production scale dry room. The lithiated electrodes may be incorporated into energy storage devices, for example, but not limited to, lithium-ion batteries, lithium-ion capacitors, etc.

Figure 1:
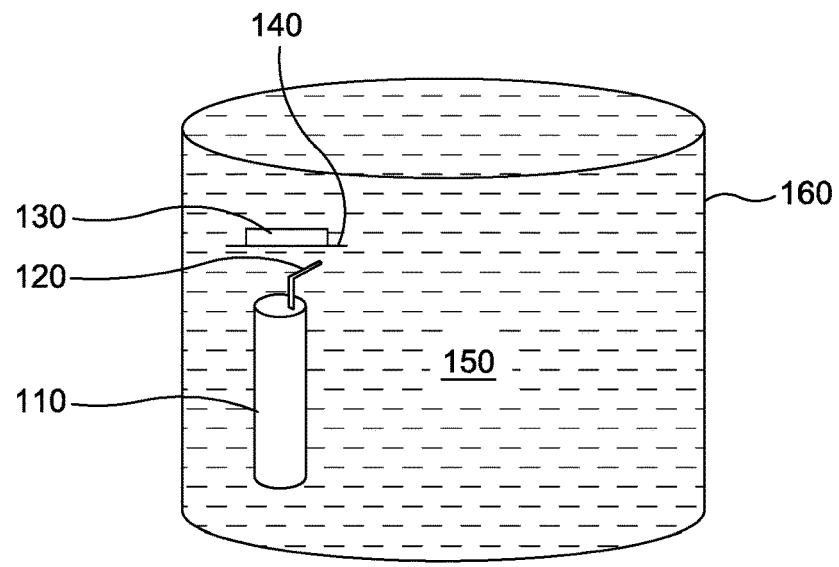
FIG. 1 is a diagram illustrating a roll with a metal tab connected to or from a current collector of an electrode to be lithiated.

FIG. 1 is a diagram illustrating a view of a roll 110 with a metal tab 120 connected to or from a current collector 117b (see FIG. 3), a piece of lithium 130, electrolyte 150, and a container 160 according to various example embodiments. A piece of Li metal 130 with predetermined weight, attached to a conductive material 140 with high conductivity, such as copper or nickel foil, is attached to the metal tab 120 or directly to the current collector 117b (in which case the metal tab 120 may be omitted) of the roll 110. The roll 110 with optional metal tab 120 and the piece of Li metal 130 with conductive material 140 are placed inside a container 160 filled with electrolytes 150 according to various embodiments. One roll 110 with metal tab 120 may be connected to one or more pieces of Li metal 130 with conductive material(s) 140. Conversely, one piece of Li metal 130, optionally with conductive material 140, may be connected to one or more rolls 110 with metal tab(s) 120. Alternatively, the piece of Li metal 130 with predetermined weight can be attached to the metal tab 120 of the roll 110 directly, without being attached to a conductive material 140.

Figure 2:
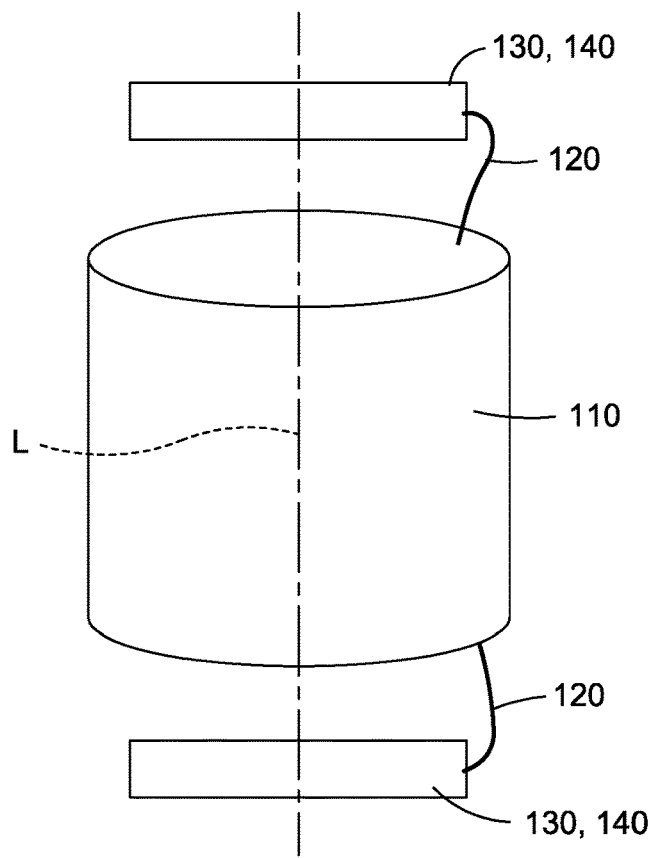
FIG. 2 is a diagram illustrating a roll with a metal tab connected to or from a current collector of an electrode to be lithiated.

FIG. 2 is a diagram illustrating a roll 110 with a metal tab 120 connected to or from a current collector 117b (see FIG. 3) of an electrode to be lithiated. A piece of Li metal 130 with predetermined weight, attached to a conductive material 140 with high conductivity, such as copper or nickel, is attached to the metal tab 120 or directly to the current collector 117b (in which case the metal tab 120 may be omitted) of the roll 110. The piece of Li metal 130 with attached conductive material 140 can be placed anywhere in relation to the roll 110 as the metal tab 120 or current collector 117b allows. However, for a faster lithiation process, the piece of Li metal 130 with attached conductive material 140 should be placed as close to the roll 110 as possible, preferably above or below the roll 110 (e.g. on a longitudinal axis L of a cylindrical jellyroll as shown). One roll 110 with optional metal tab 120 may be connected to one or more pieces of Li metal 130 with conductive material(s) 140. Conversely, one piece of Li metal 130, optionally with conductive material 140, may be connected to one or more rolls 110 with metal tab(s) 120. Alternatively, the piece of Li metal 130 with predetermined weight can be attached to the metal tab 120 of the roll 110 directly, without being attached to a conductive material 140. The metal tab 120 or current collector 117b may be attached either to the piece of Li metal 130 or a conductive material 140 attached to the piece of Li metal 130. Thus, the element labeled "130, 140" in FIG. 2 may be either or both of the piece of Li metal 130 and the conductive material 140.

Figure 3:
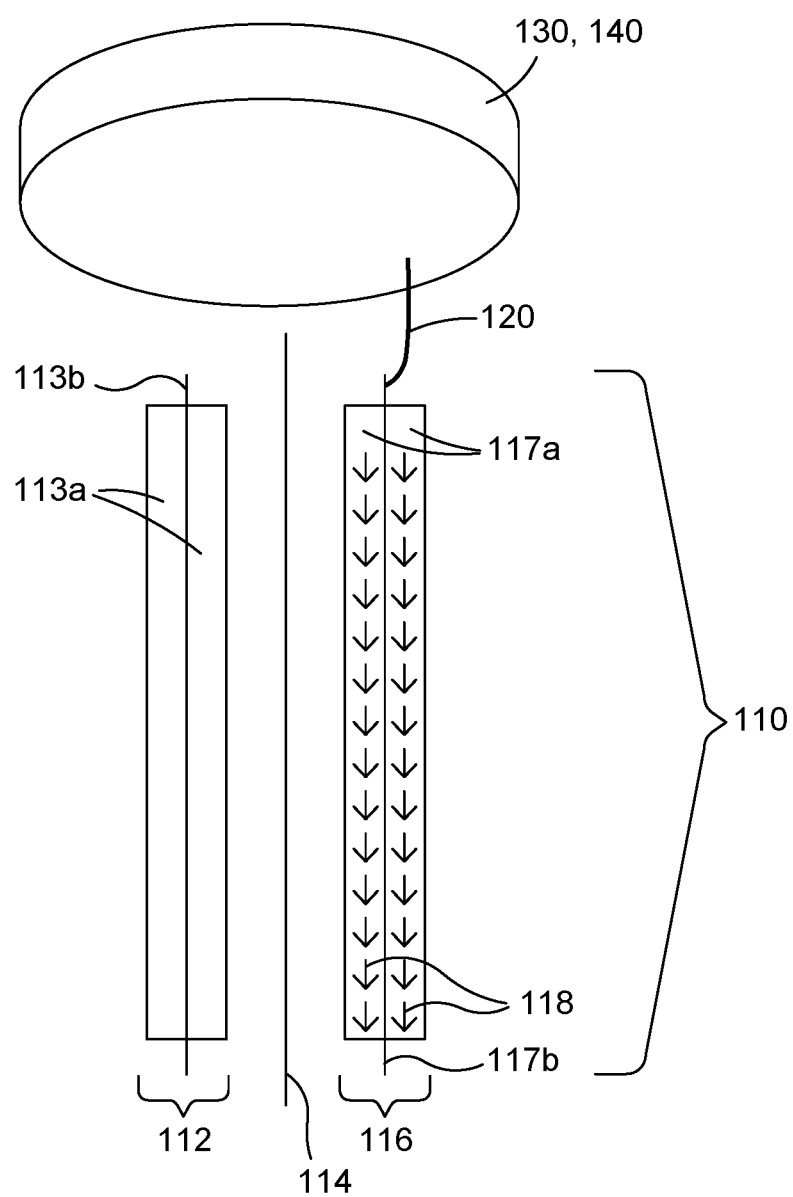
FIG. 3 is a diagram illustrating a Stage 2 roll consisting of a positive electrode, a separator, and a negative electrode.

FIG. 3 is a diagram illustrating a Stage 2 roll 110 consisting of a positive electrode 112, a separator 114, and a negative electrode 116. A piece of Li metal 130 with predetermined weight, attached to a conductive material 140 with high conductivity, such as copper or nickel, is attached to the metal tab 120 or directly to the current collector 117b (in which case the metal tab 120 may be omitted) of the roll 110. The piece of Li metal 130 and/or conductive material 140 is placed above or below the roll 110. Therefore, the lithiation paths 118 are along the surfaces of the negative electrode active layers 117a. As such, Li ions don't need to pass through the electrode 116, and a low cost solid metal foil can be used as the current collector 117b inside the electrode 116. Again, one roll 110 with optional metal tab 120 may be connected to one or more pieces of Li metal 130 with conductive material(s) 140. Conversely, one piece of Li metal 130, optionally with conductive material 140, may be connected to one or more rolls 110 with metal tab(s) 120. Alternatively, the piece of Li metal 130 with predetermined weight can be attached to the metal tab 120 or current collector 117b of the roll 110 directly, without being attached to a conductive material 140.

Figure 4:
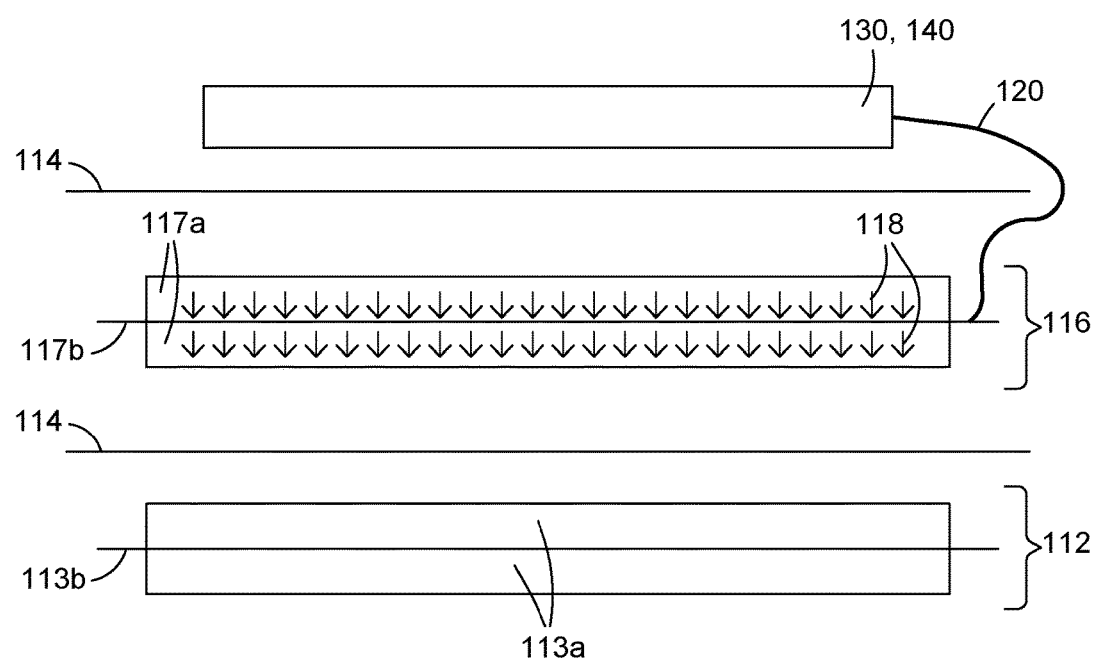
FIG. 4 is another diagram illustrating the Stage 2 roll of FIG. 3, consisting of the positive electrode, separator, and negative electrode, along with another separator.

FIG. 4 is another diagram illustrating the Stage 2 roll 110 of FIG. 3, consisting of the positive electrode 112, separator 114, and negative electrode 116, along with another separator 114. As in FIG. 3, the piece of Li metal 130 with predetermined weight, attached to the conductive material 140 with high conductivity, such as copper or nickel, is attached to the metal tab 120 or directly to the current collector 117b (in which case the metal tab 120 may be omitted) of the roll 110. However, in the example of FIG. 4, the piece of Li metal 130 with conductive material 140 is placed not above or below the roll 110 but to the side of the roll 110 (e.g. off the longitudinal axis L of FIG. 2). Therefore, the lithiation paths 118 are perpendicular to the surfaces of the negative electrode active layers 117a. As such, Li ions need to pass through the electrode 116, and a high cost mesh type metal foil or a high cost perforated metal foil must be used as the current collector 117b inside the electrode 116. If a solid metal foil is used inside the electrode 116 as the current collector 117b, the electrode 116 must be perforated before making the Stage 2 roll 110. Again, one roll 110 with optional metal tab 120 may be connected to one or more pieces of Li metal 130 with conductive material(s) 140. Conversely, one piece of Li metal 130, optionally with conductive material 140, may be connected to one or more rolls 110 with metal tab(s) 120. Alternatively, the piece of Li metal 130 with predetermined weight can be attached to the metal tab 120 or current collector 117b of the roll 110 directly, without being attached to a conductive material 140.

Referring to FIGS. 1-4, at least one metal tab 120 of the roll 110 may come from or be connected to a current collector 117b (see FIG. 3) of the electrode to be lithiated. The roll 110 may consist of a single electrode (i.e. a Stage 1 roll also referred to as an electrode roll); or a jellyroll consisting of at least one negative electrode 116, one separator 114, and one positive electrode 112 as shown in FIGS. 3 and 4 (Stage 2 roll also referred to as an electrode pack); or an unfinished battery or ultracapacitor with an electrode pack inside and with a case and with or without an unsealed lid (Stage 3 roll also referred to as a cell assembly).

The piece of lithium metal 130 may be attached to a conductive material 140 with high conductivity such as a piece of copper or nickel foil. Alternatively, the piece of Lithium metal 130 may not be attached to a conductive material 140.

The roll 110 and the piece of Li metal 130 are connected to each other through the metal tab 120 or directly through the current collector 117b (in which case the metal tab 120 may be omitted) of the roll 110 and the conductive material 140 attached to the piece of Li metal 130. Alternatively, if there is only a piece of Lithium metal 130 and no attached conductive material 140, the piece of Lithium metal 130 can be attached to the metal tab 120 or current collector 117b of the roll 110 directly. The piece of Li metal 130 and optional conductive material 140 can be located anywhere relative to the roll 110, within the bounds and flexibility of the metal tab 120 or current collector 117b. This includes the piece of Li metal 130 and optional conductive material 140 being above, next to, or below the roll 110. However, for a fast lithiation process, the piece of Li metal 130 and optional conductive material 140 should be placed as close to the roll 110 as possible, preferably on the top or at the bottom of the roll 110 (e.g. on a longitudinal axis L of a cylindrical jellyroll), as shown in FIGS. 2 and 3, where the lithiation paths 118 are along the surfaces of the negative electrode active layers 117a. Another relative location of the piece of Li metal 130 and optional conductive material 140 to the roll 110 is shown in FIG. 4, where the lithiation paths 118 are vertical to the roll 110, thus requiring a high cost mesh type metal foil or a high cost perforated metal foil to be used as the current collector 117b inside the negative electrode 116. Or, alternatively, if a solid metal foil is used inside the negative electrode 116 as the current collector 117b, the negative electrode 116 may be perforated before making the Stage 2 roll 110.

Figure 5:
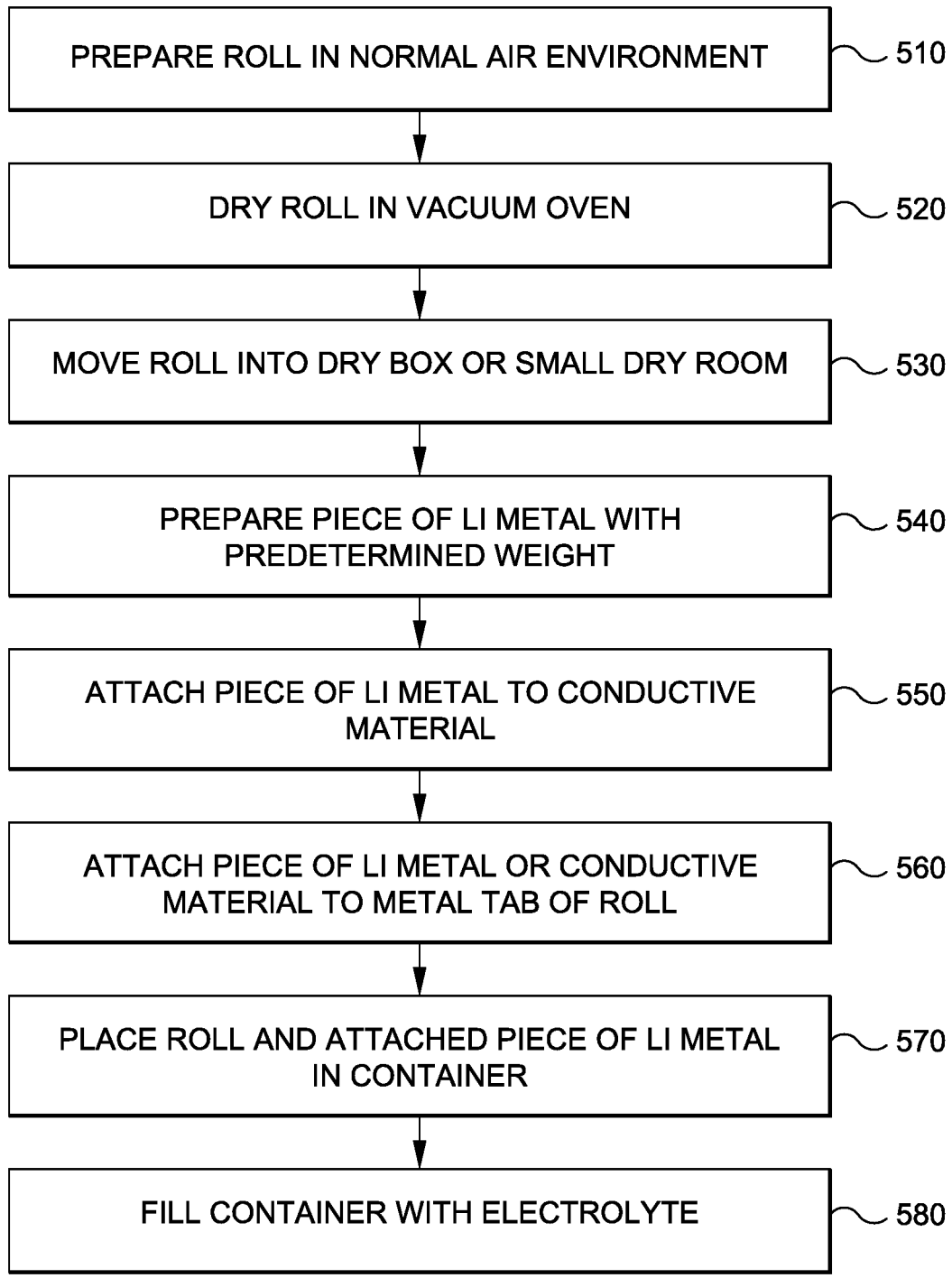
FIG. 5 shows an example operational flow of a lithiation method for producing Li pre-doped electrodes.

FIG. 5 shows an example operational flow of a lithiation method for producing Li pre-doped electrodes. The operational flow may begin with preparing the roll 110 in a normal air environment (step 510), drying the roll 110 in a vacuum oven (step 520), and moving the roll 110 into a dry box or small dry room (step 530). The roll 110 may consist of a single electrode such as the negative electrode 116 (i.e. a Stage 1 roll also referred to as an electrode roll). Alternatively, the roll 110 may consist of an electrode pack, e.g. a jellyroll, consisting of at least one negative electrode 116, at least one separator 114, and at least one positive electrode 112 (i.e. a Stage 2 roll also referred to as an electrode pack). Alternatively, the roll 110 may consist of an unfinished battery or ultracapacitor with an electrode pack, e.g. a jellyroll, inside a case and with or without an unsealed lid (i.e. a Stage 3 roll also referred to as a cell assembly). In any case, at least one metal tab 120 may be connected to or from the negative electrode 116 to be lithiated (e.g. connected to or from a current collector 117b thereof).

The operational flow may continue with preparing the piece of Li metal 130 with predetermined weight separately in the dry box or the small dry room (step 540) and, optionally, attaching the piece of Li metal 130 to a conductive material 140 with high conductivity, such as copper or nickel foil (Step 550), for example, by mechanical press. The piece of Li metal 130 or, optionally, the conductive material 140 attached thereto, may then be attached to the metal tab 120 or directly to the current collector 117b of the roll 110 (step 560), that is, the metal tab 120 or current collector 117b of the negative electrode 160 to be lithiated (or metal tab 120 or current collector 113b of positive electrode 112 to be lithiated), for example, by welding (e.g. laser welding, ultrasonic welding, cold welding). In this way, a single roll 110, optionally with metal tab 120, may be connected to one or more pieces of lithium metal 130. Conversely, a single piece of lithium metal 130 may be attached to one or more rolls 110 with metal tab(s) 120.

The operational flow may further include placing at least one roll 110 and piece of Li metal 130 in the container 160 (step 570) and filling the container 160 with electrolyte 150 containing Li salts (step 580). The electrolyte 150 may be reusable during a process of lithiating multiple electrodes. The order of the steps is not limited to the example shown in FIG. 5. For example, steps 570 and 580 can be reversed, with the container 160 first being filled with the electrolyte 150 and thereafter the roll(s) 110 and piece(s) of Li metal 130 being placed in the container 160. The container 160 is a container for holding the electrolyte 150. Lithiation or pre-doping may begin immediately after the roll(s) 110 and Li metal 130 (with optional conductive material) are connected (via metal tab(s) 120 or directly via current collector(s) 117b) and placed inside the electrolyte 150 in the container 160.

The Li metal 130 may be located anywhere in relation to the roll 110 as described above. In some embodiments, the inner wall of the container 160 may be made conductive and serve as the conductive material 140 and the piece of Li metal 130 can be installed on or be a part of the inner wall of the container 160. In that case, steps 560 and 570 can be reversed or occur substantially simultaneously, as the roll 110 is placed inside the container 160 and attached to the inner wall thereof.

The container 160 of electrolyte 150 may contain one or more multiple rolls 110 with optional metal tab(s) 120 and may contain one or more multiple pieces of Li metal 130 with optional conductive material(s) 140. When the lithiation or pre-doping process is finished, the roll(s) with metal tab(s) 120 may be removed from the container 160.

In the case of lithiation of a Stage 3 roll consisting of a cell assembly, one of the options is that the cell packaging case, i.e. the can, outside of the electrode pack may itself serve as the container 160. In this situation, the electrode pack, e.g. jellyroll, inside the can, may be regarded as the roll 110, and a piece of Li metal 130 (and optional conductive material 140) may be connected to the electrode pack and inserted into the can serving as the container 160. The can may then be filled with the electrolyte 150 to begin the lithiation or pre-doping process. In this case, excess Li metal 130 may be removed from the can serving as the container 160 when the lithiation is complete. The most significant advantage of this approach is that the large dry room for the electrode preparation and the cell manufacture is not needed. Lithium is not introduced during the electrode or electrode pack preparation process. It is introduced only during the late steps of the cell assembly.

This lithiation methods disclosed herein may need a longer lithiation time than the direct contact method. However, the disclosed methods may prevent the electrode, separator and cell damage caused by the shorting and strong reactions between the Li metal and the electrode being lithiated. The method disclosed herein also provides lithiation paths along the electrode surfaces such that a low cost solid current collector can be used inside the electrodes.

Depending on whether a Stage 1, Stage 2, or Stage 3 roll 110 is to be lithiated, the assembly of the electrodes or electrode packs (e.g. jellyrolls) or complete energy storage devices, such as battery and Ultracapacitor, can be conducted in a normal air environment before the Li metal 130 is introduced and connected to the rolls 110. Thus, in the case of a Stage 2 or Stage 3 roll 110, the dry room size requirements may be reduced. For Stage 3 roll lithiation, no dry room is necessary, since the lithium is introduced only at the last steps of cell assembly. After the electrodes, electrode packs (e.g. jellyrolls), or energy storage devices are prepared, the rolls 110 can be dried and moved into a dry box or a small dry room and then connected to the piece of Li metal 130 and immersed in a container 160 filled with electrolytes 150 containing Li salts. This eliminates the need for a full scale dry room, which can be very expensive to build, maintain, and operate.

Figure 6:
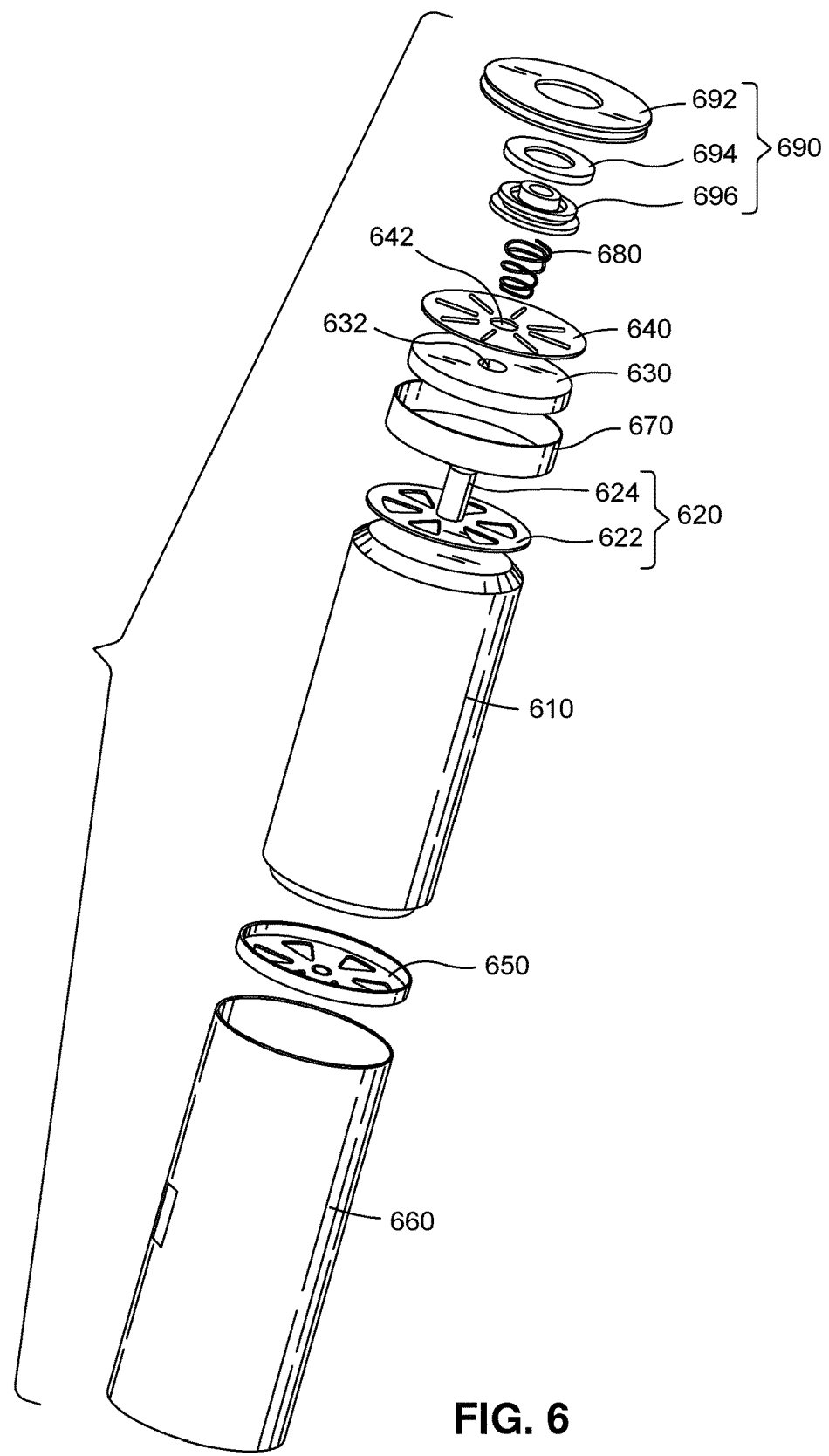
FIG. 6 is an exploded perspective view of a Stage 2 roll, can, and lid assembly illustrating various components used in a lithiation method for producing Li pre-doped electrodes according to one or more embodiments of the present disclosure.

FIG. 6 is an exploded perspective view of a Stage 2 roll 610, can 660, and lid assembly 690 illustrating various components used in a lithiation method for producing Li pre-doped electrodes according to one or more embodiments of the present disclosure. The roll 610 may be an example of the roll 110 shown and described in relation to FIGS. 1-5 and may consist of an electrode pack, e.g. a jellyroll, consisting of at least one negative electrode, at least one separator, and at least one positive electrode. After being wound into a jellyroll, the roll 610 may, for example, be scored on both ends and have current collector tabs flattened. As shown in FIG. 6, current collectors 620 and 650 may then be welded to the top and bottom of the roll 610 and the roll 610 may be inserted into the can 660, whose bottom may be beaded and ultrasonically welded to the current collector 650 to function as a terminal. The can 660 may be made of aluminum, stainless steel, Ni, or any other metals. The lid assembly 690 (which may also itself be referred to as a lid) may be prepared, for example, by spin riveting a rivet 696 to a lid 692 with a grommet 694 there between.

The current collector 620, which may be a negative current collector, may comprise a disc 622 and a post 624, which may be integrally formed, for example, from copper, or stainless steel, or Ni or any other metal that is suitable. The disc 622 may have a larger contact area with the roll 610 relative to the contact area of the tab 120 with the roll 110 described in relation to FIGS. 1-5 and may, for example, substantially cover an end surface (e.g. the top surface) of the roll 610. Due to the large contact area, electrical contact can be reliably maintained. The disc 622 may be round as shown or may be square, triangular, or another shape. As shown, the post 624 may be centrally formed on the disc 622 so as to protrude away from the roll 610 (e.g. upward) when the current collector 620 is attached to the roll 610. In addition to serving as an electrical contact between the current collector 620 and the lid assembly 690 to function as a terminal, the post 624 may serve to receive and position a piece of Li metal 630 on the current collector 620 for Li pre-doping the roll 610. The disc 622 may be cup-shaped with an upwardly protruding perimeter, which may help constrain the piece of Li metal 630 on the current collector 620 while also increasing surface area contact between the current collector 620 and the piece of Li metal 630.

Figure 7A:
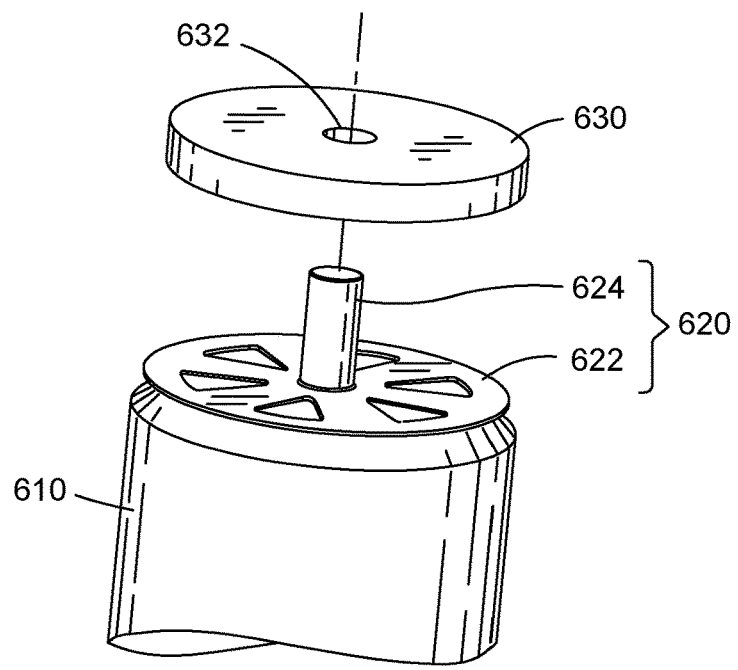
Figure 7B:
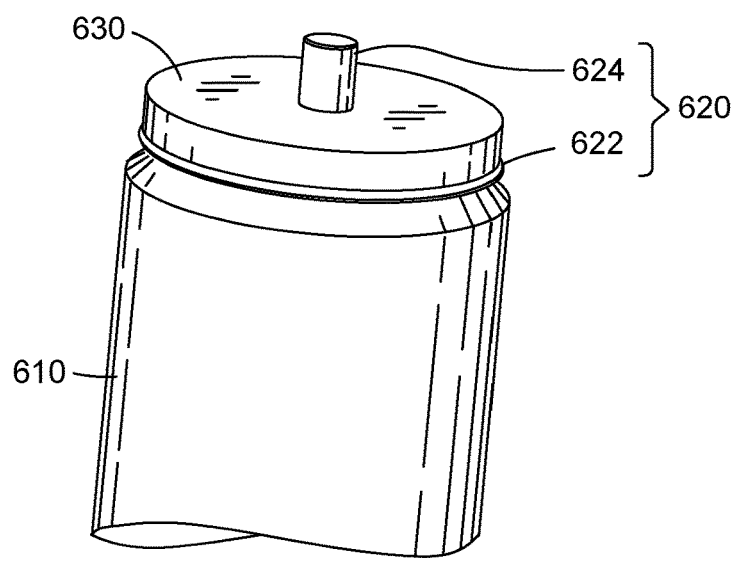

FIGS. 7A-7D show an example sequence of steps of the lithiation method of FIG. 6. Referring to FIGS. 7A and 7B, an example of placement of the piece of Li metal 630 on the current collector 620 is shown, with the piece of Li metal 630 being received on the post 624 of the current collector 620. To this end, the piece of Li metal 630 may define a borehole 632 into which the post 624 may be inserted. The borehole 632 may have a cross-sectional extent (e.g. diameter) that is slightly greater than that of the post 624 so that the post 624 can fit into the borehole 632. As described above, the disc 622 of the current collector 620 may substantially cover the top surface of the roll 610. With the piece of Li metal 630 on the current collector 620 as shown in FIG. 7B, the piece of Li metal 630 may likewise substantially cover the top surface of the disc 622, thus promoting electrical contact between the piece of Li metal 630 and the electrode(s) of the roll 610 via the current collector 620.

FIG. 7C shows the subsequent placement of a cover plate 640 on the piece of Li metal 630. The cover plate 640 may be a disc-shaped piece of copper, or stainless steel, or Ni, or any other suitable metal. The shape of the cover plate 640 may match that of the disc 622 except that the cover plate 640 may define a hole 642 into which the post 624 may be inserted. The hole 642 may have a cross-sectional extent (e.g. diameter) that is slightly greater than that of the post 624 so that the post 624 can fit into the hole 642. In this way, the cover plate 640 may be placed on the post 624 to sandwich the piece of Li metal 630 between the current collector 620 and the cover plate 640. As shown in FIG. 6, an optional insulator 670, which may be ring-shaped, may be placed around the piece of Li metal 630 between the current collector 620 and the cover plate 640 or extending to either side of the Li metal 630 to additionally surround either or both of the current collector 620 and the cover plate 640. The insulator 670 may serve to insulate the piece of Li metal 630, the current collector 620, and the cover plate 640 from the can 660 and may restrict movement of the assembled current collector 620, piece of Li metal 630, and cover plate 640.

Referring to FIGS. 7C and 7D, the lid assembly 690, which may include the lid 692, grommet 694, and rivet 696, may then be placed on top of the cover plate 640 with a biasing member such as a spring 680 positioned there between so as to bias the cover plate 640 downward away from the lid assembly 690. The spring 680 may, for example, be positioned to surround a protruding portion of the post 624 that extends above the cover plate 640 through the hole 642. One end of the spring 680 may abut the top surface of the cover plate 640 as shown in FIG. 7D, and the other end of the spring 680 may abut a bottom surface of the lid assembly 690 as shown in FIG. 8. By biasing the cover plate 640 downward away from the lid assembly 690, the spring 680 or other biasing member may bias the piece of Li metal 630 toward the current collector 620, thus serving to compress the piece of Li metal 630 downward against the current collector 620. In this way, even as the piece of Li metal 640 dissolves and becomes smaller during the lithiation of the roll 610, electrical contact between the piece of Li metal 640 and the current collector 620 can reliably be maintained.

The steps of FIGS. 7A-7D may be performed in a dry room, concluding with the closure of the can 660 by the lid assembly 690 and laser welding of the current collector 620 (e.g. the post 624) to the lid assembly 690 (e.g. to the rivet 696). The lid assembly 690 may be attached to the can 660, for example, by laser welding, with the spring 680 in a compressed position to push the cover plate 640 downward against the piece of Li metal 630 as described above. In the above example, the can 660 has already been attached to the roll 610 at this stage, so the attachment of the lid assembly 690 effectively closes the can 660. Alternatively, the insertion of the assembled components into the can 660 may be part of the last step and may itself take place in the dry room as the can 660 is attached to the lid assembly 690.

After drying the unit (i.e. the can 660 closed that has been closed with the lid assembly 690) in an oven, electrolyte impregnation may be performed in a dry box or oven via an impregnation hole formed in the rivet 696, a temporary screw seal may be applied to temporarily close the impregnation hole, and the unit may be placed in an oven for formation. The disc 622 and/or the cover plate 640 may define various holes, slits, etc. as shown in order to promote contact between the electrolyte and the piece of Li metal 630. The unit may be washed and dried, and moved back into the dry room, the temporary screw seal may be removed, and the impregnation hole may be permanently closed, for example, by laser welding.

In the above example described in relation to FIGS. 6-8, the current collector 620 includes a post 624 that extends through the piece of Li metal 630 and the cover plate 640 to be welded to the rivet 696 of the lid assembly 690. However, the disclosure is not intended to be so limited. For example, in a case where the disc 622 is cup-shaped with an upwardly protruding perimeter as described above (as opposed to a flat disc 622 as shown), the upwardly protruding perimeter may serve to constrain the piece of Li metal 630 and cover plate 620 as they are placed in the cup. With an appropriately structured lid assembly 690, the upwardly protruding perimeter of the disc 622 may further be used to establish electrical connection with the lid assembly 690 to act as a terminal, such that the post 624 may be omitted.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for lithiation of an electrode for use in an energy storage device, the method comprising:
   providing a roll including an electrode to be lithiated;
   attaching a current collector to the roll;
   placing a piece of lithium metal with predetermined weight in contact with the current collector;
   enclosing the roll, the current collector, and the piece of lithium metal in a can with a lid; and
   filling the can with an electrolyte containing a lithium salt.

2. The method of claim 1, wherein the current collector substantially covers an end surface of the roll.

3. The method of claim 1, wherein the current collector is disc-shaped.

4. The method of claim 1, wherein the current collector includes a post that protrudes away from the roll when the current collector is attached to the roll.

5. The method of claim 4, wherein said placing the piece of lithium metal includes inserting the post through a borehole defined in the piece of lithium metal.

6. The method of claim 1, further comprising arranging a biasing member to bias the piece of lithium metal toward the current collector, wherein said enclosing includes enclosing the roll, the current collector, the piece of lithium metal, and the biasing member in the can with the lid.

7. The method of claim 6, further comprising sandwiching the piece of lithium metal between the current collector and a cover plate.

8. The method of claim 7, wherein the biasing member includes a spring and said arranging the biasing member includes placing the spring with one end of the spring abutting the cover plate and another end of the spring abutting the lid.

9. The method of claim 8, wherein the current collector includes a post that protrudes away from the roll when the current collector is attached to the roll, said placing the piece of lithium metal includes inserting the post through a borehole defined in the piece of lithium metal, and said sandwiching includes inserting the post through a hole defined in the cover plate.

10. A device for lithiating an electrode, the device comprising:
    a roll including an electrode to be lithiated;
    a current collector attached to the roll;
    a piece of lithium metal with predetermined weight in contact with the current collector; and
    a can with a lid enclosing the roll, the current collector, and the piece of lithium metal.

11. The device of claim 10, wherein the current collector substantially covers an end surface of the roll.

12. The device of claim 10, wherein the current collector is disc-shaped.

13. The device of claim 10, wherein the current collector includes a post that protrudes away from the roll.

14. The device of claim 13, wherein the piece of lithium metal defines a borehole through which the post extends.

15. The device of claim 10, further comprising a biasing member arranged to bias the piece of lithium metal toward the current collector, wherein the can with the lid encloses the roll, the current collector, the piece of lithium metal, and the biasing member.

16. The device of claim 15, further comprising a cover plate, the piece of lithium metal being sandwiched between the current collector and the cover plate.

17. The device of claim 16, wherein the biasing member includes a spring placed with one end abutting the cover plate and another end abutting the lid.

18. The device of claim 17, wherein the current collector includes a post that protrudes away from the roll, the piece of lithium metal defines a borehole through which the post extends, and the cover plate defines a hole through which the post extends.

19. A device for lithiating an electrode, the device comprising:
 a roll including an electrode to be lithiated; and
 a current collector attached to the roll and substantially covering an end surface thereof, the current collector including a protrusion that extends away from the roll.

20. The device of claim 19, wherein the current collector is disc-shaped and the protrusion is a post centrally formed on the disc-shaped current collector.

* * * * *